June 4, 1935.  F. L. MacKENZIE  2,003,377
FASTENING SUPPLYING APPARATUS
Filed Oct. 9, 1933  2 Sheets-Sheet 1

INVENTOR-
Fred L. MacKenzie
By his attorney
Victor Cobb

June 4, 1935.   F. L. MacKENZIE   2,003,377
FASTENING SUPPLYING APPARATUS
Filed Oct. 9, 1933   2 Sheets-Sheet 2

INVENTOR
Fred L. MacKenzie
By his Attorney
Victor Cobb.

Patented June 4, 1935

2,003,377

UNITED STATES PATENT OFFICE 2,003,377

FASTENING-SUPPLYING APPARATUS

Fred L. MacKenzie, Beverly, Mass., assignor to United Shoe Machinery Corporation, Paterson, N. J., a corporation of New Jersey Application October 9, 1933, Serial No. 692,715

12 Claims. (Cl. 1—39)

This invention relates to apparatus for supplying fastenings. It more particularly concerns the supplying of nails in loads or groups by distributors to the inserting mechanisms of heel-attaching machines, and is herein illustrated in connection with an apparatus in which each group delivered includes nails of different lengths.

When nails advanced along the raceway of a distributor differ considerably in length, it is desirable to so oscillate said raceway that the longer, heavier nails may be caused to travel at a rate sufficient to insure continuous delivery, and to differently adjust the oscillation if shorter nails are being used, so they may not be displaced by excessive vibration. An object of my invention is to effect such a control by a simple mechanism convenient to adjust, and which will avoid difficulties arising from interference with elements present in such an existing type of nail-distributor as that disclosed in Letters Patent of the United States No. 1,657,630, Lund, January 31, 1928.

I attain the above-mentioned object by the combination with a movable raceway, its pivoted support, which may consist of a lever having spaced arms upon which the raceway is mounted and an intermediate arm, and a rotatable member for producing the raceway-movement, of a connecting member or link joining the rotatable moving or actuating member to the supporting member, preferably to the intermediate arm thereof, and means arranged to secure said connecting member at different distances from the pivot of the supporting member. As a result of this variation in the connection, an extent of oscillatory movement of the raceway may be produced which will give the best results for the length or lengths of nails in use, and this with little change from the arrangement of supporting and actuating elements which have previously been used. Further, by forming the connecting member as a sectional yoke-shaped link converging from two separated actuating members to an arm of the raceway-supporting lever, the present organization lends itself well to inclusion, without material change in the usual elements, in such nail-distributors as that of the previously mentioned patent. Yieldability of the connections facilitates manufacturing and assembling operations and decreases the danger of breakage during the action of the distributor.

Figure 1:
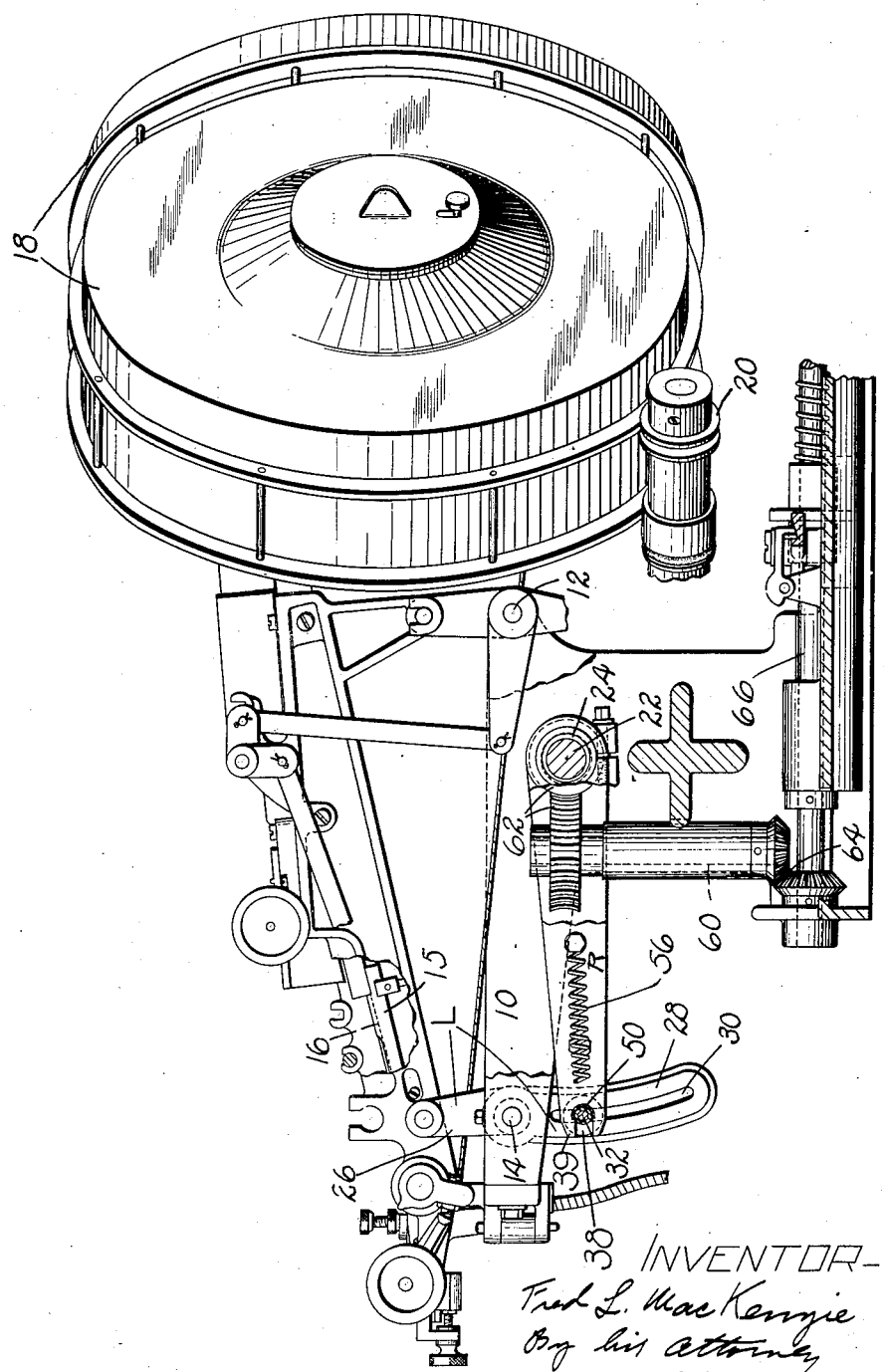
Figure 2:
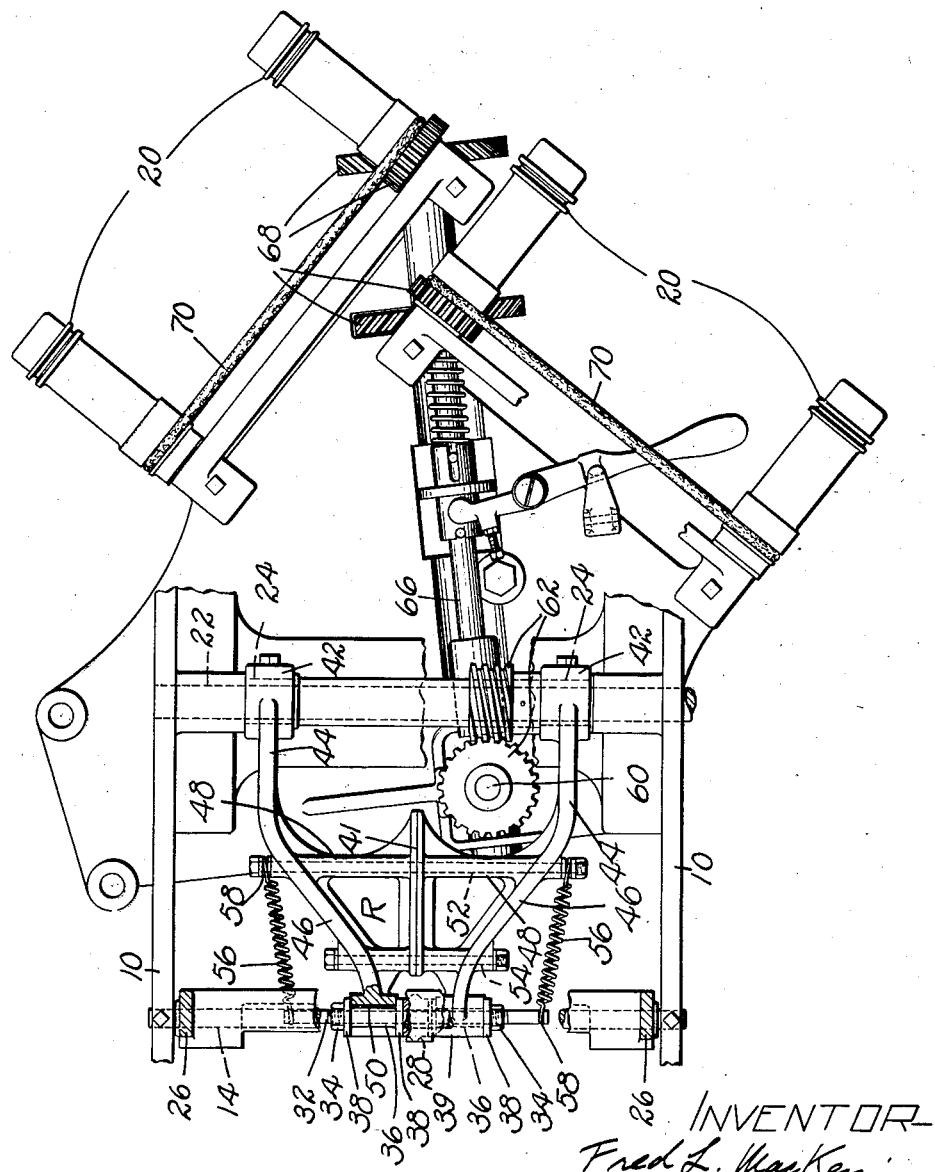

The accompanying drawings illustrate a particular embodiment of my invention, included in a distributor of the Lund type, Fig. 1 being a broken longitudinal sectional view taken just inside one of the side frames; and Fig. 2 is a broken top plan view with the raceway removed.

Upon a frame 10 are journaled a transverse rear rock-shaft 12 and a forward rock-shaft 14 upon which is mounted an inclined double raceway 15, as shown in the Lund patent. In longitudinal grooves 16 of the adjacent sections of this raceway nails of two lengths may be separately conducted to a discharge device which is not shown in the drawings. The nails are supplied to the two raceway-sections from separate drums 18, 18 rotatable upon pairs of grooved rolls 20. The manner in which motion is imparted to the rolls and drums will later appear. Journaled in the frame is a driven shaft 22 carrying spaced eccentrics 24, 24, from which a nail-advancing oscillation is imparted to the raceway by novel connections which will now be described.

The rock-shaft 14 furnishes the pivot or fulcrum-portion of a lever L having upwardly extending arms 26, 26 spaced from each other to support the opposite sides of the raceway. Midway between the arms 26, 26 is a depending arm 28, in which is a longitudinal slot 30 curved in an arc about the axis of the eccentric-shaft 22. Passing through the slot is a rod 32 threaded near its opposite extremities to receive nuts 34, 34. Surrounding the rod between the nuts and the arm 28, at each side of the latter, are sleeves 36 each having a pair of end-flanges 38, 38. By forcing either of the nuts 34 against the adjacent flange, the inner flanges of both sleeves may be pressed against the arm, this permitting the rod to be clamped at any desired point along the slot. Straddling each sleeve between the flanges, so it is free to turn thereon, is the slotted forward end 39 of one portion of a sectional eccentric-rod or link R. These sections are preferably symmetrical on each side of a longitudinal center-line 41, being shown as having at the rear extremity a strap 42 surrounding one of the eccentrics 24. These straps are followed by relatively widely spaced arms 44, and then converging portions 46 which have transversely extending dividing webs 48 contacting along the center-line. Finally come the slotted ends 39 of the link which receive the rod 32. Yieldable material, such as leather, may be inserted at 50 at the bottom of the slots for contact with the rod. This provides a substantially uniform bearing for both link-ends. The link-sections are secured to each other by tie-rods 52 and 54, which pass through bores in the web-portions 48. The sleeves 36 upon the rod 32 may be held yieldably in the slots of the ends 39 by opposite tension-springs 56, 56, looped over grooved portions 58 of the rods 32 and 52 where they project beyond their securing nuts.

The drums 18 are rotated to supply their contained nails to the raceway as in the Lund patent: That is, just forward of the eccentric-shaft 22 a vertical shaft 60 is journaled in the frame, being driven from the eccentric-shaft through worm-gearing 62. Bevel-gearing 64 joins the bottom of the vertical shaft to a rearwardly extending horizontal shaft 66, and this, in turn, is connected by spiral gearing 68, 68 to one of the grooved rolls 20 supporting each drum. Rotation of the other roll of each pair may be produced through belt-gearing 70. Inspection of Fig. 1 of the drawings will show that the upper end of the shaft 60 and the worm-gearing 62 will be located in the field in which the link R must operate; but with the arrangement which I have devised the shaft and gearing may lie, without causing interference, between the spaced arms 44, 44 of the link. At the same time, the convergence of the opposite link-sections from the double eccentrics to the centrally located lever-arm 28 will give an actuating force for the raceway which will be balanced and without tendency to produce pounding and consequent noise and wear. Since the link-sections lying at opposite sides of the vertical shaft are separable, the link may readily be applied to and removed from the apparatus without disturbing other elements.

In the use of my improved connecting means, an adjustment of the rod 32 to the upper extremity of the slot 30 will, in an obvious manner, give the maximum throw of the lever-arms 26 and of the raceway suitable for forwarding long nails. When one of the nuts 34 is loosened and the rod 32 dropped in the slot and again secured, a shorter throw will be given for the better feeding of nails of less length. The illustrated distributor is organized to deliver simultaneously nails of different lengths. This difference, however, is not so great that an adjustment of the connections as herein disclosed may not be made which is suitable for both. The slotted and spring-retained connections of the link to the rod 32 at 39 render exact machining less necessary, facilitate assembly, maintain perfect engagement in spite of wear, and reduce the danger of breakage in case of clogging.

Having described my invention, what I claim as new and desire to secure by Letters Patent of the United States is:

1. In a fastening-supplying apparatus, a movable raceway, a pivoted supporting member upon which the raceway rests at its opposite sides, a rotatable member for moving the raceway, a connecting member joining the rotatable member to the supporting member, and means arranged to secure the connecting member to the supporting member at different distances from the pivot thereof.

2. In a fastening-supplying apparatus, a movable raceway, a pivoted supporting member upon which the raceway rests at its opposite sides, two rotatable members for moving the raceway, a connecting member joining both rotatable members to the supporting member between the points of engagement with the raceway, and means arranged to secure the connecting member to such intermediate portion of the supporting member at different distances from the pivot thereof.

3. In a fastening-supplying apparatus, a movable raceway, a pivoted supporting member upon which the raceway rests at its opposite sides, two rotatable members for moving the raceway, a connecting member joining both rotatable members to the supporting member between the points of engagement with the raceway, said connecting member being formed in separable sections corresponding to the rotatable members, and means arranged to secure the connecting member to such intermediate portion of the supporting member at different distances from the pivot thereof.

4. In a nail-distributor, an oscillatory raceway over which nails of different lengths may advance, a lever upon which the raceway is supported, a rotatable member for moving the raceway, a link connecting the rotatable member and the lever, and means arranged to fix the point of connection of the link to the lever at different distances from the fulcrum of the lever to correspond to different lengths of nails.

5. In a nail-distributor, an oscillatory raceway, a lever having spaced arms upon which the raceway is mounted and an intermediate arm, a rotatable member for moving the raceway, a link connecting the rotatable member to the intermediate arm of the lever, and means arranged to fix the point of connection of the link to the intermediate lever-arm at different distances from a fulcrum of the lever.

6. In a nail-distributor, an oscillatory raceway, a lever having spaced arms upon which the raceway is mounted and an intermediate arm, a rotatable shaft, two separated members carried by the shaft, a connecting yoke formed in separable sections and converging from the two members to the intermediate lever-arm, a gear fixed to the shaft, and a rotatable driving gear meshing with the shaft-gear and lying between the sections.

7. In a nail-distributor, an oscillatory raceway, a lever having spaced arms upon which the raceway is mounted and an intermediate arm, two separated rotatable members, and a connecting yoke converging from the two rotatable members to opposite sides of the intermediate lever-arm where it is provided with slots, a rod projecting at each side of each lever-arm and lying in slots, and means for yieldably holding the rod in the slots.

8. In a nail-distributor, an oscillatory raceway, a lever having spaced arms upon which the raceway is mounted and an intermediate arm having a slot, two separated rotatable members, a connecting yoke formed in separable sections and converging from the two rotatable members to the opposite sides of the intermediate lever-arm where it is provided with slots, a rod passing through the slots in the arm and yoke and having means for joining the yoke at different points in the arm-slot, and a spring joining the rod to the yoke.

9. In a nail-distributor, an oscillatory raceway, a lever having spaced arms upon which the raceway is mounted and an intermediate arm having a slot, two separated rotatable members, a connecting yoke formed in separable sections and converging from the two rotatable members to the opposite sides of the intermediate lever-arm where it is provided with slots, a tie-rod uniting the sections, a rod passing through the slots in the arm and yoke, means for clamping the last-mentioned rod at different points in the arm-slot, and springs joining the opposite ends of the rods.

10. In a multi-length nail-distributor, an oscillatory raceway, rotatable nail-drums delivering thereto, an eccentric-shaft extending horizontally beneath and transversely of the raceway, a vertical shaft extending downwardly from a point adjacent to the under side of the raceway, gearing uniting the vertical shaft and the eccentric-shaft, actuating connections from the vertical shaft to the nail-drums, a lever having upwardly extending spaced arms upon which the raceway is mounted and an intermediate depending arm, and a link connecting the eccentric-shaft to the depending arm of the lever and lying at opposite sides of the vertical shaft.

11. In a multi-length nail-distributor, an oscillatory raceway, rotatable nail-drums delivering thereto, an eccentric-shaft extending horizontally beneath and transversely of the raceway, a vertical shaft extending downwardly from a point adjacent to the under side of the raceway, gearing uniting the vertical shaft and the eccentric-shaft, actuating connections from the vertical shaft to the nail-drums, a lever having upwardly extending spaced arms upon which the raceway is mounted and an intermediate depending arm, a link connecting the eccentric-shaft to the depending arm of the lever and lying at opposite sides of the vertical shaft, and means arranged to fix the point of connection of the link to the depending arm at different distances from the fulcrum of the lever.

12. In a multi-length nail-distributor, an oscillatory raceway, rotatable nail-drums delivering thereto, a shaft extending horizontally beneath and transversely of the raceway and carrying two eccentrics, a vertical shaft extending downwardly from a point adjacent to the under side of the raceway, gearing uniting the vertical shaft to the eccentric-shaft, actuating connections from the vertical shaft to the nail-drums, a lever having upwardly extending spaced arms upon which the raceway is mounted and an intermediate depending arm, and a yoke having straps surrounding the eccentrics and converging therefrom to the depending lever-arm to which it is connected, said yoke being in separable sections lying at opposite sides of the vertical shaft.

FRED L. MacKENZIE.